United States Patent [19]

Bergmann et al.

[11] Patent Number: 4,619,992
[45] Date of Patent: Oct. 28, 1986

[54] 3-(β-AMINOETHYL)-4-CYANO-ISO-THIAZOLYLAZO DYES

[75] Inventors: Udo Bergmann, Darmstadt; Johannes P. Dix, Neuhofen; Guenter Hansen; Ernst Schefczik, both of Ludwigshafen, all of Fed. Rep. of Germany

[73] Assignee: BASF Aktiengesellschaft, Rheinland-Pfalz, Fed. Rep. of Germany

[21] Appl. No.: 710,993

[22] Filed: Mar. 12, 1985

[30] Foreign Application Priority Data

Mar. 14, 1984 [DE] Fed. Rep. of Germany ....... 3409243

[51] Int. Cl.$^4$ .............. C09B 29/039; D06P 1/18; D06P 3/54
[52] U.S. Cl. .................... 534/733; 534/640; 534/765; 534/766; 534/767; 534/768; 534/769; 534/777; 534/778; 534/794; 534/795
[58] Field of Search .............. 534/765, 766, 767, 769, 534/733, 777, 778, 794, 795, 640, 768

[56] References Cited

U.S. PATENT DOCUMENTS

| 4,324,899 | 4/1982 | Frishberg | 534/795 |
| 4,496,480 | 1/1985 | Bergmann et al. | 534/794 |
| 4,500,718 | 2/1985 | Furstenwerth | 534/778 X |

FOREIGN PATENT DOCUMENTS

| 0087677 | 9/1983 | European Pat. Off. | 534/794 |
| 0087616 | 9/1983 | European Pat. Off. | 534/794 |
| 0135131 | 3/1985 | European Pat. Off. | 534/794 |
| 2041391 | 9/1980 | United Kingdom | 534/794 |

Primary Examiner—Floyd D. Higel
Attorney, Agent, or Firm—Oblon, Fisher, Spivak, McClelland & Maier

[57] ABSTRACT

A compound of the formula:

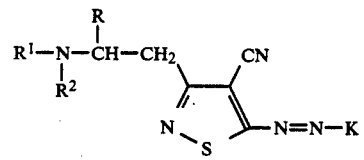

where R is hydrogen, $C_1$–$C_4$-alkyl, phenyl, chlorophenyl, methylphenyl, methoxyphenyl or nitrophenyl; $R^1$ is allyl, $C_1$–$C_8$-alkyl, $C_1$–$C_8$-alkyl substituted by $C_1$–$C_8$-alkoxy, phenoxy, phenyl or $C_1$–$C_8$-alkanoyloxy, cyclopentyl, cyclohexyl, methylcyclohexyl, norbornyl, phenyl or phenyl substituted by chlorine, methyl or alkoxy; $R^2$ is $C_1$–$C_{10}$-alkanoyl, $C_1$–$C_{10}$-alkanoyl substituted by alkoxy or phenoxy, cyclohexanoyl, benzoyl, benzoyl substituted by chlorine, methyl or methoxy, $C_1$–$C_8$-alkoxycarbonyl, aminocarbonyl, phenylaminocarbonyl, $CH_3NHCO$, $C_2H_5NHCO$, $C_3H_7NHCO$, $C_4H_9NHCO$, $(CH_3)_2NCO$, $CH_3SO_2$, $C_6H_5SO_2$ or p—$CH_3$—$C_6H_4$—$SO_2$; or $R^1$ and $R^2$, together with the nitrogen atom, form a ring system, and K is a radical of a coupling component. The isothiazolylylazo compound of the invention is useful for the dyeing of the polyesters, nylon, and cellulose esters.

4 Claims, No Drawings

3-(β-AMINOETHYL)-4-CYANO-ISO-THIAZOLYLAZO DYES

The present invention relates to compounds of the general formula I

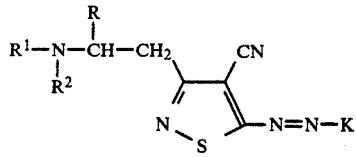

where R is hydrogen, $C_1$–$C_4$-alkyl or unsubstituted or substituted phenyl, $R^1$ is allyl, unsubstituted or substituted alkyl, cycloalkyl or aryl, $R^2$ is acyl, $R^1$ and $R^2$, together with the nitrogen, form a saturated 5-membered or 6-membered ring or a diacylimide radical, and K is a radical of a coupling component.

Specific examples of radicals R, in addition to hydrogen, are butyl, propyl, ethyl, phenyl, chlorophenyl, methylphenyl, methoxyphenyl, nitrophenyl and, preferably, methyl.

Examples of suitable radicals $R^1$ are $C_1$–$C_8$-alkyl which may furthermore be interrupted by oxygen and substituted by $C_1$–$C_8$-alkoxy, phenoxy, phenyl or $C_1$–$C_8$-alkanoyloxy, and cyclopentyl, cyclohexyl, methylcyclohexyl and norbornyl, and phenyl which is unsubstituted or substituted by chlorine, methyl or alkoxy.

Specific examples of radicals $R^1$ in addition to those stated above are: $CH_3$, $C_2H_5$, $C_3H_7$, $C_4H_9$, $C_6H_{13}$, $C_8H_{17}$, $C_2H_5OCH_2CH_2$, $CH_3OCH_2CH_2CH_2$, $C_4H_9OCH_2CH_2CH_2$, $CH_3CONHCH_2CH_2$, $C_2H_5OCOCH_2$, $CH_3OCOCHCH_3$, $C_6H_5OCH_2CH_2$, $C_6H_5OCH_2CH_2OCH_2CH_2CH_2$, $C_6H_5CH_2$, $C_6H_5CH_2CH_2$,

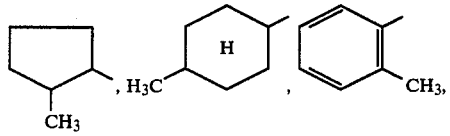

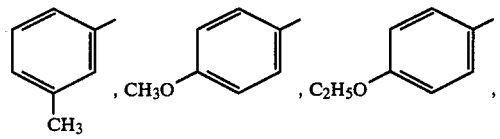

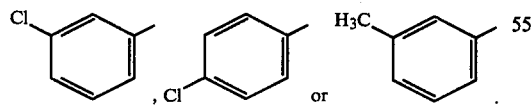

In the case of radicals which can occur in isomeric form, the n-, iso- and tert.-compounds are all embraced by the abbreviated formula.

$R^2$ is, for example, $C_1$–$C_{10}$-alkanoyl which may furthermore be substituted by alkoxy or phenoxy, or is cyclohexanoyl, or is benzoyl which is unsubstituted or substituted by chlorine, methyl or methoxy, or is $C_1$–$C_8$-alkoxycarbonyl, unsubstituted, N-monosubstituted or N,N-disubstituted aminocarbonyl or phenylaminocarbonyl or the corresponding alkyl-, aryl- or aminosulfonyl radicals.

Specific examples of acyl radicals $R_2$ are CHO,

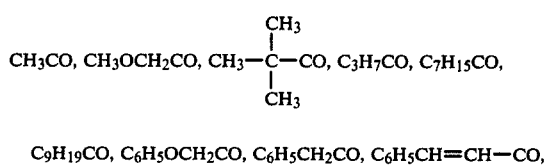

$C_9H_{19}CO$, $C_6H_5OCH_2CO$, $C_6H_5CH_2CO$, $C_6H_5CH=CH-CO$,

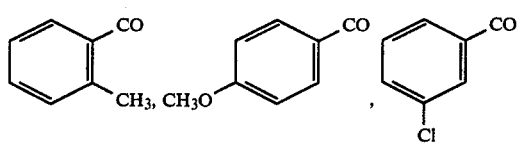

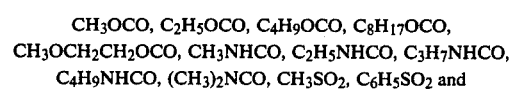

$CH_3OCO$, $C_2H_5OCO$, $C_4H_9OCO$, $C_8H_{17}OCO$, $CH_3OCH_2CH_2OCO$, $CH_3NHCO$, $C_2H_5NHCO$, $C_3H_7NHCO$, $C_4H_9NHCO$, $(CH_3)_2NCO$, $CH_3SO_2$, $C_6H_5SO_2$ and

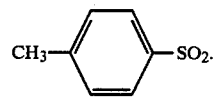

$R^1$ and $R^2$ together with the nitrogen form, for example, the following radicals:

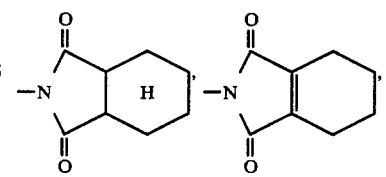

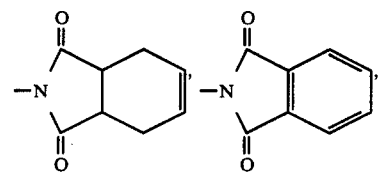

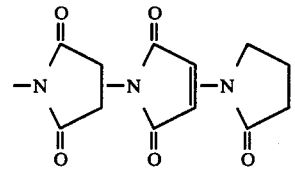

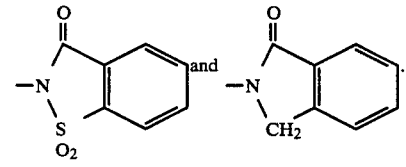

The coupling components KH are derived from, in particular, the aniline, naphthalene or heterocyclic series.

The coupling components KH are of, in particular, the general formulae

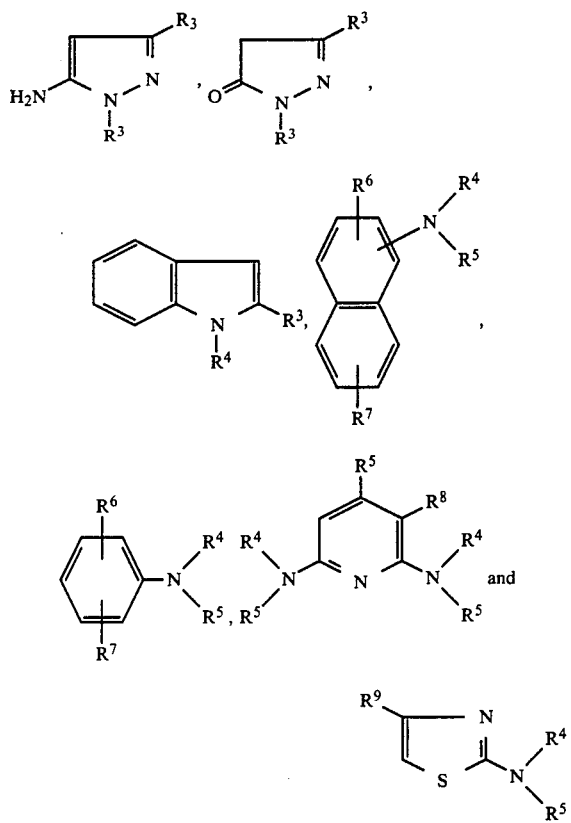

where $R^3$ is hydrogen, alkyl, aralkyl or aryl, $R^4$ is hydrogen or $R^5$, $R^5$ is unsubstituted or substituted alkyl, cycloalkyl, alkenyl, aralkyl or aryl, $R^6$ and $R^7$ are each hydrogen, alkyl, alkoxy, phenoxy, halogen, alkylsulfonylamino, dialkylaminosulfonylamino or acylamino, $R^8$ is cyano, carbamyl, nitro or carbalkoxy and $R^9$ is unsubstituted or substituted phenyl, alkyl or aralkyl.

Specific examples of radicals $R^3$, in addition to those stated above, are methyl, ethyl, propyl, butyl, benzyl, phenethyl, phenyl, o-, m- and p-tolyl and o-, m- and p-chlorophenyl.

Examples of radicals $R^5$, in addition to those stated above, are $C_1$-$C_6$-alkyl which can be substituted by chlorine, bromine, hydroxyl, $C_1$-$C_8$-alkoxy, phenoxy, cyano, carboxyl, $C_1$-$C_8$-alkanoyloxy, $C_1$-$C_8$-alkoxy-$C_1$-$C_4$-alkoxy, benzoyloxy, o-, m- or p-methylbenzoyloxy, o-, m- or p-chlorobenzoyloxy, $C_1$-$C_8$-alkoxyalkanoyloxy, phenoxyalkanoyloxy, $C_1$-$C_8$-alkoxycarbonyloxy, $C_1$-$C_8$-alkoxyalkoxycarbonyloxy, benzyloxycarbonyloxy, phenethyloxycarbonyloxy, phenoxyethoxy-carbonyloxy, $C_1$-$C_8$-alkylaminocarbonyloxy, cyclohexyl-aminocarbonyloxy, phenylaminocarbonyloxy, $C_1$-$C_8$-alkoxy-carbonyl, $C_1$-$C_8$-alkoxyalkoxycarbonyl, phenoxycarbonyl, benzyloxycarbonyl, phenoxy-$C_1$-$C_4$-alkoxy or phenethyloxy-carbonyl, and phenyl, benzyl, phenethyl and cyclohexyl.

Specific examples of radicals $R^5$ are methyl, ethyl, propyl, butyl, pentyl, hexyl, allyl, methallyl, 2-chloroethyl, 2-bromoethyl, 2-cyanoethyl, 2-hydroxyethyl, 2-phenyl-2-hydroxyethyl, 2,3-dihydroxypropyl, 2-hydroxypropyl, 2-hydroxy-butyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethyl-carbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2-phenyloxycarbonyloxyethyl, 2-benzyloxycarbonyloxyethyl, 2-methoxyethoxycarbonyloxyethyl, 2-ethoxyethoxycarbonyl-oxyethyl, 2-propoxyethoxycarbonyloxyethyl, 2-butoxyethoxycarbonyloxyethyl, 2-methylaminocarbonyloxyethyl, 2-ethyl-aminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxy-carbonylethyl, 2-phenoxycarbonylethyl, 2-benzyloxycarbonyl-ethyl, 2-β-phenylethoxycarbonylethyl, 2-methoxyethoxy-carbonylethyl, 2-ethoxyethoxycarbonylethyl, 2-propoxyethoxycarbonylethyl, 2-butoxyethoxycarbonylethyl, 2-phen-oxyethoxycarbonylethyl and 2-benzoylethyl.

Examples of suitable radicals $R^6$ and $R^7$ are hydrogen, methyl, ethyl, propyl, bromine, chlorine, methoxy, ethoxy, phenoxy, benzyloxy, $C_1$-$C_6$-alkanoylamino, benzylamino and $C_1$-$C_4$-alkylsulfonylamino and -dialkylaminosulfonylamino.

Examples of radicals $R^8$ in addition to those stated above are aminocarbonyl, methylaminocarbonyl, dimethylaminocarbonyl, ethylaminocarbonyl, diethylaminocarbonyl, methoxycarbonyl, ethoxycarbonyl, n- and isopropoxycarbonyl, n-, iso- and sec.-butoxycarbonyl, methoxyethoxycarbonyl, ethoxyethoxycarbonyl, n- and isopropoxyethoxycarbonyl and n-, iso- and sec.-butoxyethoxycarbonyl.

$R^9$ is, for example, $C_1$-$C_4$-alkyl, $C_1$-$C_4$-alkoxycarbonylmethyl, cyanomethyl, benzyl or phenyl which is monosubstituted or polysubstituted by $C_1$-$C_{10}$-alkyl, $C_1$-$C_{10}$-alkoxy, phenoxy, benzyloxy, phenyl, chlorine, bromine, nitro, $C_1$-$C_4$-alkoxycarbonyl, $C_1$-$C_4$-mono- or di-alkylamino, $C_1$-$C_4$-alkoxyethoxy, $C_1$-$C_4$-alkyl- or phenylmercapto or $C_1$-$C_5$-alkanoylamino, such as acetylamino, propionylamino, butyrylamino or valerylamino.

The compounds of the formula I have yellow to blue hues and are particularly suitable for dyeing polyesters, nylons, cellulose esters and blends of polyesters and cellulose fibers. The dyeings obtained generally have good fastness properties, particularly on polyesters.

The compounds of the formula I can be prepared by reacting a diazonium compound of an amine of the formula

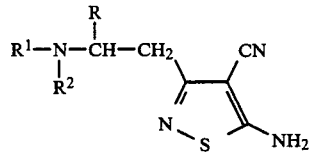

with a coupling component of the formula

KH by a conventional method.

The Examples which follow illustrate the preparation. Parts and percentages are by weight, unless stated otherwise.

Of particular importance are compounds of the formula Ia

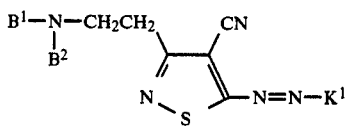
where $B^1$ is $C_1$–$C_8$-alkyl, $B^2$ is acyl and $K^1$ is a radical of a coupling component from the aniline or thiazole series.
Preferred coupling components $K^1H$ are:
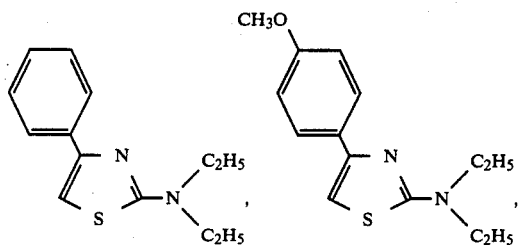
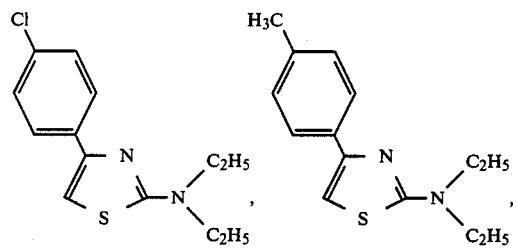
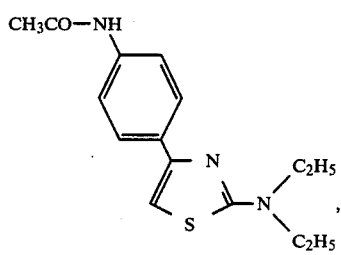
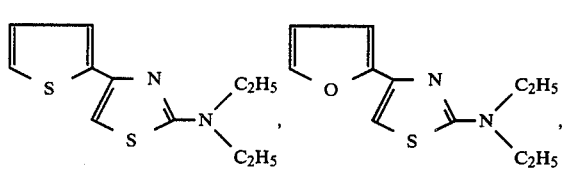
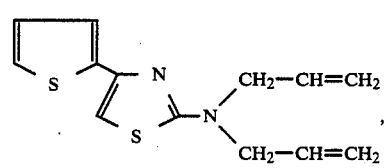
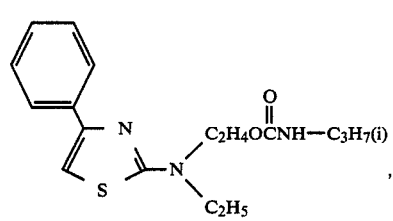
-continued
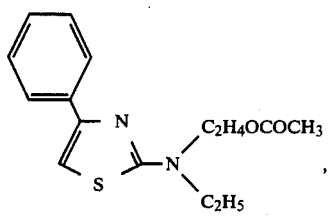
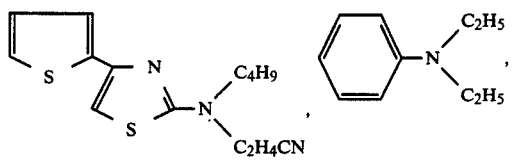
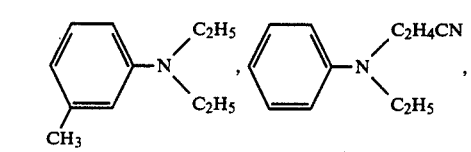
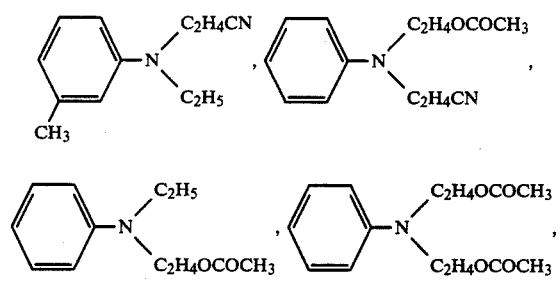
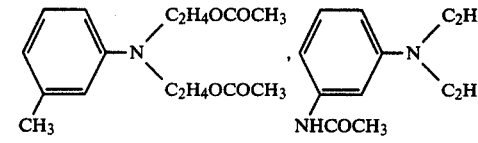
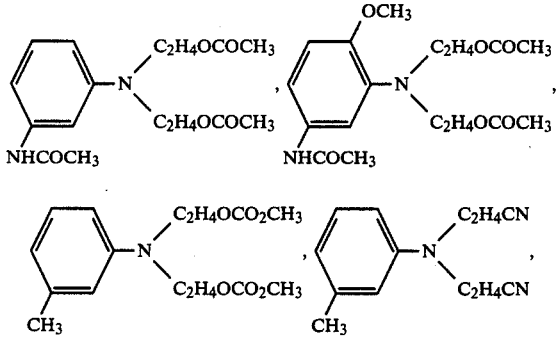
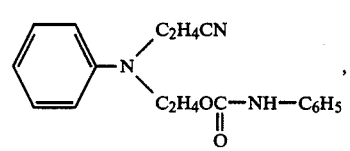

-continued

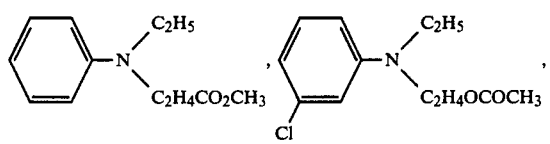

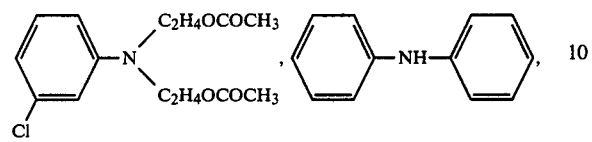

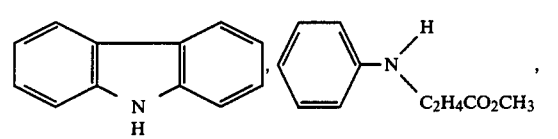

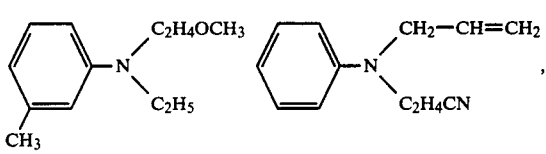

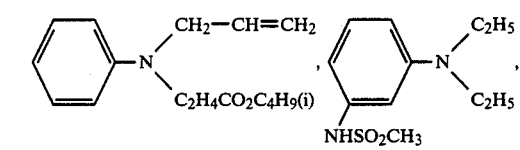

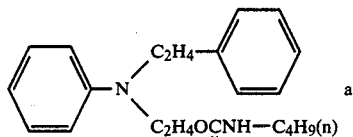

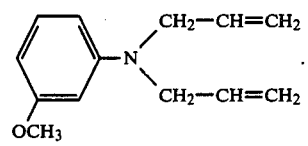

EXAMPLE 1

11.9 parts of 5-amino-4-cyano-3-β-[N,N-acetylethylamino]-ethylisothiazole were dissolved in 75 parts by volume of a mixture of 17 parts of glacial acetic acid and 3 parts of propionic acid. 20 parts of 85% strength sulfuric acid were added, after which 16 parts of nitrosylsulfuric acid (11.5% of $N_2O_3$) were run slowly into the stirred solution at 0°–5° C., and stirring was continued at the same temperature for 4 hours. The resulting diazonium salt solution was run slowly into a mixture of 12.8 parts of 4-phenyl-2-(N-diallylamino)-thiazole, 20 parts of acetic acid, 250 parts of water, 250 parts of ice and one part of amidosulfonic acid. When coupling was complete, the dye was filtered off under suction, washed neutral and dried at 50° C. under reduced pressure to give 18.0 parts of the dye of the formula

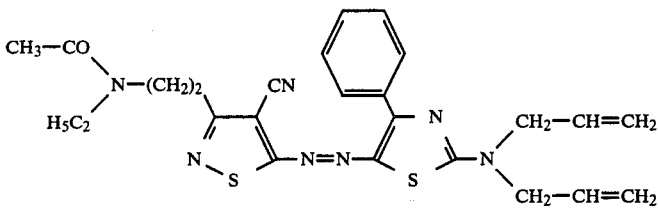

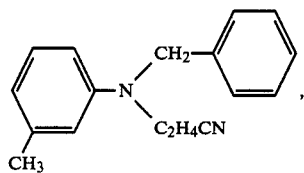

This dye dyes polyesters in deep violet hues which have good lightfastness and fastness to dry heat pleating and setting.

The dyes characterized in the Table below by diazo and coupling components are also obtained similarly to Example 1.

| Example | Diazo component | Coupling component | Hue on polyesters |
|---|---|---|---|
| 2 | -(CH2)2-isothiazole-CN-NH2) | 2) | violet |

-continued

| Example | Diazo component | Coupling component | Hue on polyesters |
|---|---|---|---|
| 3 | " | phenyl-thiazole with N(CH$_3$)(C$_2$H$_5$) substituent | violet |
| 4 | " | phenyl-thiazole with N(C$_2$H$_5$)(C$_2$H$_4$CO$_2$CH$_3$) substituent | violet |
| 5 | " | 4-methoxyphenyl-thiazole with N(C$_2$H$_4$OCOCH$_3$)(C$_2$H$_5$) substituent | navy |
| 6 | " | phenyl-thiazole with N(C$_2$H$_4$OC(O)NHCH$_3$)(C$_2$H$_5$) substituent | blue |
| 7 | " | phenyl-thiazole with NH(C$_6$H$_5$) substituent | blue |
| 8 | " | 4-methoxyphenyl-thiazole with N(C$_2$H$_5$)$_2$ substituent | blue |

-continued

| Example | Diazo component | Coupling component | Hue on polyesters |
|---|---|---|---|
| 9 | " | 4-chlorophenyl-thiazole with N(C2H5)2 | blue |
| 10 | " | 4-(CH3CONH)phenyl-thiazole with N(C2H5)2 | blue |
| 11 | CH3CO-N(C6H5)-(CH2)2- group on isothiazole with CN and NH2 | thiophene-thiazole with N(C2H5)2 | blue |
| 12 | " | thiophene-thiazole with NH-C4H9 | blue |
| 13 | " | thiophene-thiazole with N(C2H4OCH3)(C2H5) | blue |
| 14 | " | thiophene-thiazole with N(C4H9)(C2H4CN) | blue |
| 15 | " | thiophene-thiazole with N(C2H5)(C2H4CO2C2H5) | blue |
| 16 | " | furan-thiazole with N(C2H5)2 | navy |

-continued

| Example | Diazo component | Coupling component | Hue on polyesters |
|---|---|---|---|
| 17 | H₃COCH₂CO—N(C₂H₅)—(CH₂)₂—[3-(isothiazole-5-NH₂, 4-CN)] | 4-phenyl-2-(N,N-diethylamino)thiazole | violet |
| 18 | H₃COC(O)—N(C₂H₅)—(CH₂)₂—[isothiazole-CN-NH₂] | 4-phenyl-2-(N,N-diethylamino)thiazole | violet |
| 19 | H₁₉C₉C(O)—N(C₆H₅)—(CH₂)₂—[isothiazole-CN-NH₂] | " | violet |
| 20 | H₃C₆OCH₂C(O)—N(C₂H₅)—(CH₂)₂—[isothiazole-CN-NH₂] | " | violet |
| 21 | C₆H₅C(O)—N(C₂H₅)—(CH₂)₂—[isothiazole-CN-NH₂] | 4-(4-chlorophenyl)-2-(N,N-diethylamino)thiazole | navy |
| 22 | H₅C₂NHC(O)—N(C₂H₅)—(CH₂)₂—[isothiazole-CN-NH₂] | " | navy |
| 23 | CH₃—SO₂—N(C₂H₅)—(CH₂)₂—[isothiazole-CN-NH₂] | " | navy |

-continued

| Example | Diazo component | Coupling component | Hue on polyesters |
|---|---|---|---|
| 24 | (structure: H3C-C6H4-SO2-N(C2H5)-(CH2)2- attached to isothiazole with CN and NH2) | (structure: CH3O-C6H4- thiazole-N(C2H5)2) | blue |
| 25 | (CH3)2N-CO-N(C2H5)-(CH2)2- isothiazole with CN and NH2 | " | blue |
| 26 | phthalimido-N-(CH2)2- isothiazole with CN and NH2 | " | blue |
| 27 | maleimido-N-(CH2)2- isothiazole with CN and NH2 | (structure: thiophene-thiazole-N(C2H5)2) | blue |
| 28 | benzisothiazolone-S,S-dioxide-N-(CH2)2- isothiazole with CN and NH2 | " | blue |
| 29 | (isoindolinone)-N-(CH2)2- isothiazole with CN and NH2 | " | blue |
| 30 | (2-pyrrolinone)-N-(CH2)2- isothiazole with CN and NH2 | " | blue |

| Example | Diazo component | Coupling component | Hue on polyesters |
|---|---|---|---|
| 31 | 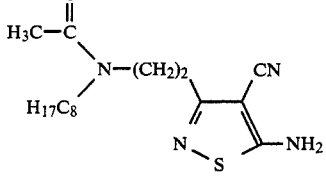 | " | blue |
| 32 | 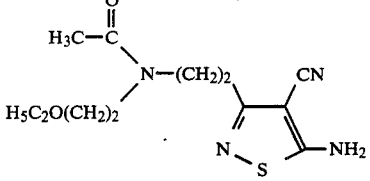 | " | blue |
| 33 | 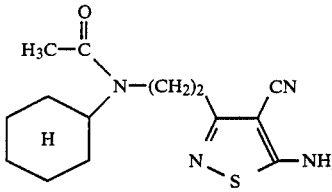 | " | blue |

EXAMPLE 34

5.0 parts of 5-amino-4-cyano-3-(2'-N-ethyl- N-propionylamino)-ethylisothiazole in a mixture of 22.5 parts by volume of acetic acid and 7.5 parts by volume of propionic acid were stirred. 10 parts by volume of an 85% strength sulfuric acid were added, after which 6.4 parts of nitrosylsulfuric acid (11.5% of $N_2O_3$) were run slowly into the stirred solution at 0°–5° C. and stirring was continued at the same temperature for 4 hours. The resulting diazonium salt solution was run slowly into a solution of 3.9 parts of N-cyanoethyl-N-ethyl-m-toluidine in a mixture of 50 parts of water, 200 parts of ice, 10 parts by volume of 32% strength hydrochloric acid, 20 parts by volume of dimethylformamide and 0.5 part of amidosulfonic acid. When coupling was complete, the dye was filtered off under suction, washed neutral and dried to give 9.2 parts of the dye of the formula

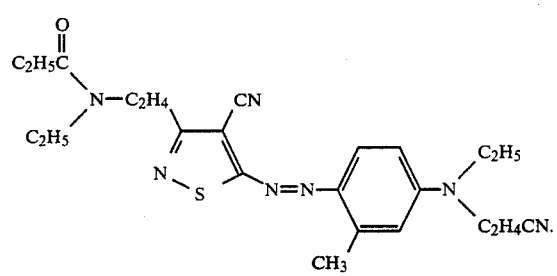

This dye dyes polyester fibers in clear bluish red fast hues.

The compounds below can be prepared by a similar method.

| Example | Diazo component | Coupling component | Hue on polyesters |
|---|---|---|---|
| 35 | 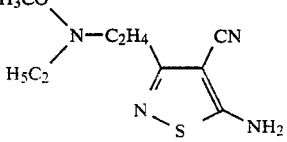 | 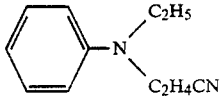 | red |
| 36 | 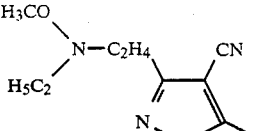 | 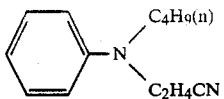 | red |

-continued
| Example | Diazo component | Coupling component | Hue on polyesters |
|---|---|---|---|
| 37 | 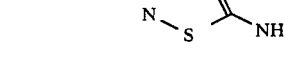 |  | red |
| 38 | 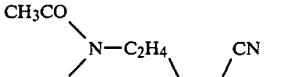 | 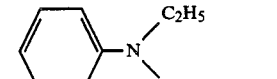 | red |
| 39 | 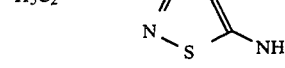 | 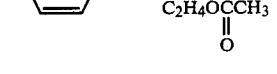 | red |
| 40 | 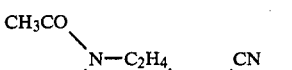 |  | red |
| 41 | 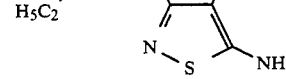 |  | red |
| 42 |  | 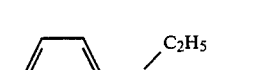 | red |
| 43 | 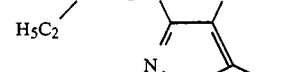 | 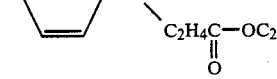 | red |
| 44 |  | 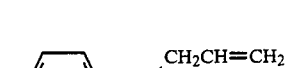 | red |
| 45 | 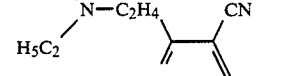 | 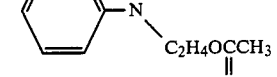 | red |

-continued

| Example | Diazo component | Coupling component | Hue on polyesters |
|---|---|---|---|
| 46 | CH₃CO–N(C₂H₅)–C₂H₄– attached to isothiazole ring with CN and NH₂ | C₆H₅–N(CH₂CH=CH₂)(C₂H₄COOC₄H₉(n)) | red |
| 47 | CH₃CO–N(C₂H₅)–C₂H₄– attached to isothiazole ring with CN and NH₂ | 3-Cl-C₆H₄–N(C₂H₄OCOCH₃)₂ | red |
| 48 | CH₃CO–N(C₂H₅)–C₂H₄– attached to isothiazole ring with CN and NH₂ | 3-NHCOCH₃-C₆H₄–N(C₂H₅)₂ | reddish violet |
| 49 | CH₃CO–N(C₂H₅)–C₂H₄– attached to isothiazole ring with CN and NH₂ | 3-NHCOCH₃-C₆H₄–N(CH₂CH=CH₂)₂ | reddish violet |
| 50 | CH₃CO–N(C₂H₅)–C₂H₄– attached to isothiazole ring with CN and NH₂ | 3-CH₃-C₆H₄–N(C₂H₄CN)(CH₂C₆H₅) | red |
| 51 | CH₃CO–N(C₂H₅)–C₂H₄– attached to isothiazole ring with CN and NH₂ | C₆H₅–N(CH₂C₆H₅)(C₂H₄OCOCH₃) | red |
| 52 | CH₃CO–N(C₂H₅)–C₂H₄– attached to isothiazole ring with CN and NH₂ | 3-NHSO₂CH₃-C₆H₄–N(C₂H₅)₂ | reddish violet |
| 53 | CH₃CO–N(C₂H₅)–C₂H₄– attached to isothiazole ring with CN and NH₂ | C₆H₅–N(C₂H₄CN)(C₂H₄OCOCH₃) | red |
| 54 | CH₃CO–N(C₂H₅)–C₂H₄– attached to isothiazole ring with CN and NH₂ | C₆H₅–N(C₂H₅)(CH₂C₆H₅) | red |

-continued

| Example | Diazo component | Coupling component | Hue on polyesters |
|---|---|---|---|
| 55 | C₂H₅CO-N(C₂H₅)-C₂H₄-[isothiazole-CN,NH₂] | C₆H₅-N(C₂H₄CN)(C₂H₅) | red |
| 56 | C₂H₅CO-N(C₂H₅)-C₂H₄-[isothiazole-CN,NH₂] | C₆H₅-N(CH₃)(C₂H₄COOC₄H₉(n)) | red |
| 57 | C₂H₅CO-N(C₂H₅)-C₂H₄-[isothiazole-CN,NH₂] | C₆H₅-N(CH₂CH=CH₂)(C₂H₄COOC₄H₉(n)) | red |
| 58 | C₂H₅CO-N(C₂H₅)-C₂H₄-[isothiazole-CN,NH₂] | 3-Cl-C₆H₄-N(C₂H₄OCOCH₃)₂ | red |
| 59 | C₂H₅CO-N(C₂H₅)-C₂H₄-[isothiazole-CN,NH₂] | 3-NHCOCH₃-C₆H₄-N(C₂H₅)₂ | reddish violet |
| 60 | C₂H₅CO-N(C₂H₅)-C₂H₄-[isothiazole-CN,NH₂] | 3-NHCOCH₃-C₆H₄-N(CH₂CH=CH₂)₂ | reddish violet |
| 61 | C₂H₅CO-N(C₂H₅)-C₂H₄-[isothiazole-CN,NH₂] | 3-CH₃-C₆H₄-N(C₂H₄CN)(CH₂C₆H₅) | red |
| 62 | C₂H₅CO-N(C₂H₅)-C₂H₄-[isothiazole-CN,NH₂] | 3-NHSO₂CH₃-C₆H₄-N(C₂H₅)₂ | reddish violet |
| 63 | C₂H₅CO-N(C₂H₅)-C₂H₄-[isothiazole-CN,NH₂] | C₆H₅-N(C₂H₄CN)(C₂H₄OCOCH₃) | red |

4,619,992
-continued
| Example | Diazo component | Coupling component | Hue on polyesters |
|---|---|---|---|
| 64 | 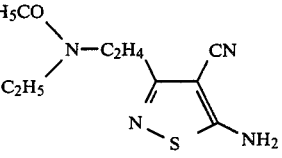 | 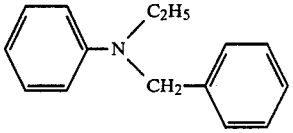 | red |
| 65 | 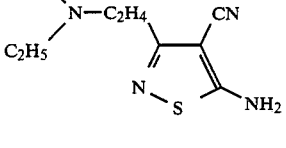 | 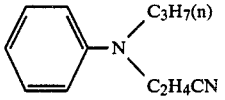 | red |
| 66 | 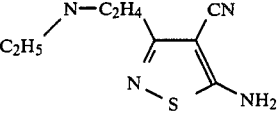 | 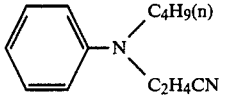 | red |
| 67 | 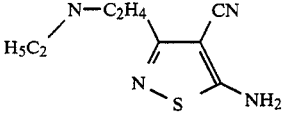 | 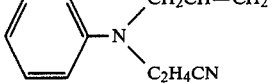 | red |
| 68 | 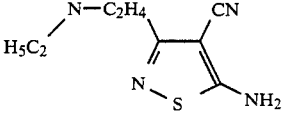 | 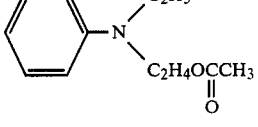 | red |
| 69 | 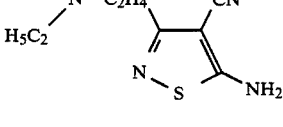 | 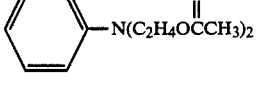 | red |
| 70 | 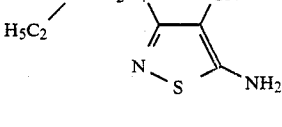 | 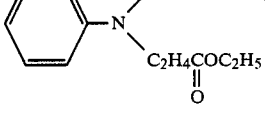 | red |
| 71 | 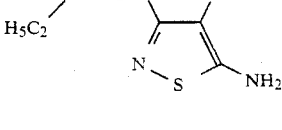 | 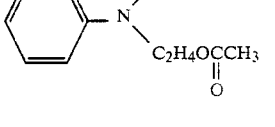 | red |
| 72 | 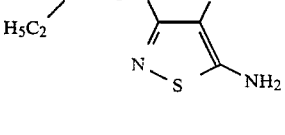 | 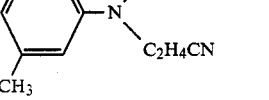 | red |

-continued

| Example | Diazo component | Coupling component | Hue on polyesters |
|---|---|---|---|
| 73 | C$_2$H$_5$CO\N(H$_5$C$_2$)—C$_2$H$_4$— [isothiazole: CN, NH$_2$, N–S ring] | 3-CH$_3$-C$_6$H$_4$–N(C$_4$H$_9$(n))(C$_2$H$_4$CN) | red |
| 74 | C$_2$H$_5$CO\N(H$_5$C$_2$)—C$_2$H$_4$— [isothiazole: CN, NH$_2$] | 3-CH$_3$-C$_6$H$_4$–N(C$_2$H$_4$OCOCH$_3$)$_2$ | red |
| 75 | CH$_3$CO\N(C$_6$H$_5$)—C$_2$H$_4$— [isothiazole: CN, NH$_2$] | C$_6$H$_5$–N(C$_2$H$_5$)(C$_2$H$_4$CN) | red |
| 76 | CH$_3$CO\N(C$_6$H$_5$)—C$_2$H$_4$— [isothiazole: CN, NH$_2$] | C$_6$H$_5$–N(C$_4$H$_9$(n))(C$_2$H$_4$CN) | red |
| 77 | CH$_3$CO\N(C$_6$H$_5$)—C$_2$H$_4$— [isothiazole: CN, NH$_2$] | C$_6$H$_5$–N(C$_2$H$_4$OCOC$_2$H$_5$)$_2$ | red |
| 78 | CH$_3$CO\N(C$_6$H$_5$)—C$_2$H$_4$— [isothiazole: CN, NH$_2$] | C$_6$H$_5$–N(C$_2$H$_5$)(C$_2$H$_4$COOC$_2$H$_5$) | red |
| 79 | CH$_3$CO\N(C$_6$H$_5$)—C$_2$H$_4$— [isothiazole: CN, NH$_2$] | C$_6$H$_5$–N(C$_2$H$_5$)(C$_2$H$_4$OCCH$_3$=O) | red |
| 80 | CH$_3$CO\N(C$_6$H$_5$)—C$_2$H$_4$— [isothiazole: CN, NH$_2$] | C$_6$H$_5$–N(C$_2$H$_4$CN)(C$_2$H$_4$OCCH$_3$=O) | red |
| 81 | CH$_3$CO\N(C$_6$H$_5$)—C$_2$H$_4$— [isothiazole: CN, NH$_2$] | 3-Cl-C$_6$H$_4$–N(CH$_2$CH=CH$_2$)$_2$ | red |

-continued

| Example | Diazo component | Coupling component | Hue on polyesters |
|---|---|---|---|
| 82 | CH₃CO-N(C₆H₅)-C₂H₄- [isothiazole ring with CN, NH₂] | 3-OCH₃-C₆H₄-N(CH₂CH=CH₂)₂ | red |
| 83 | CH₃CO-N(C₆H₅)-C₂H₄- [isothiazole ring with CN, NH₂] | C₆H₅-N(CH₃)(CH₂CH=CH₂) | red |
| 84 | CH₃CO-N(C₆H₅)-C₂H₄- [isothiazole ring with CN, NH₂] | 3-CH₃-C₆H₄-N(C₂H₄CN)(C₂H₅) | red |
| 85 | CH₃CO-N(C₆H₅)-C₂H₄- [isothiazole ring with CN, NH₂] | 3-CH₃-C₆H₄-N(C₂H₄OCOCH₃)₂ | red |
| 86 | CH₃CO-N(C₆H₅)-C₂H₄- [isothiazole ring with CN, NH₂] | C₆H₅-N(C₂H₅)(C₂H₄CN) | red |
| 87 | CH₃CO-N(C₆H₅)-C₂H₄- [isothiazole ring with CN, NH₂] | C₆H₅-N(C₄H₉(n))(C₂H₄CN) | red |
| 88 | CH₃CO-N(C₆H₅)-C₂H₄- [isothiazole ring with CN, NH₂] | C₆H₅-N(CH₂CH=CH₂)(C₂H₄CN) | red |
| 89 | CH₃CO-N(C₆H₅)-C₂H₄- [isothiazole ring with CN, NH₂] | C₆H₅-N(C₂H₅)(C₂H₄OCOCH₃) | red |
| 90 | CH₃CO-N(C₆H₅)-C₂H₄- [isothiazole ring with CN, NH₂] | C₆H₅-N(C₂H₄OCOCH₃)₂ | red |

-continued
| Example | Diazo component | Coupling component | Hue on polyesters |
|---|---|---|---|
| 91 | 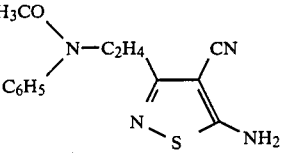 | 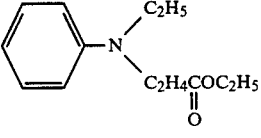 | red |
| 92 | 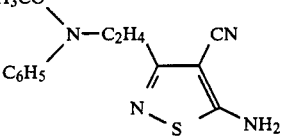 | 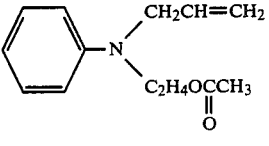 | red |
| 93 | 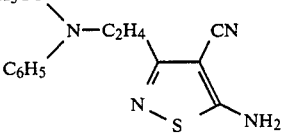 | 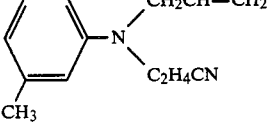 | red |
| 94 | 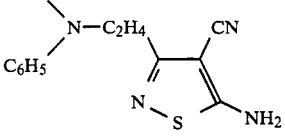 | 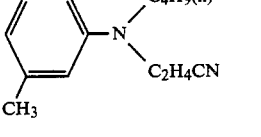 | red |
| 95 | 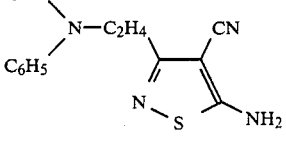 | 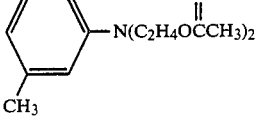 | red |
| 96 | 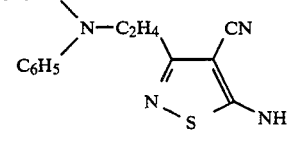 | 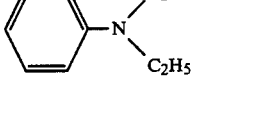 | red |
| 97 | 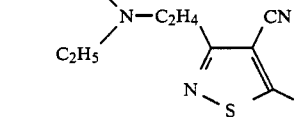 | 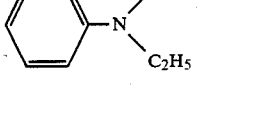 | red |
| 98 | 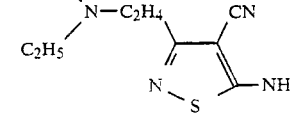 | 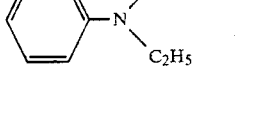 | red |
| 99 | 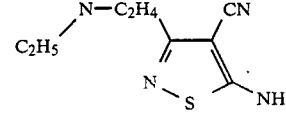 | 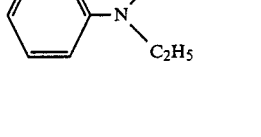 | red |

| Example | Diazo component | Coupling component | Hue on polyesters |
|---|---|---|---|
| 100 | CH$_3$SO$_2$-N(C$_2$H$_5$)-C$_2$H$_4$- attached to 4-position of 5-amino-4-cyano-isothiazole | 4-[N(C$_2$H$_4$CN)(C$_2$H$_5$)]phenyl | red |
| 101 | CH$_3$CO-N(C$_2$H$_5$OC$_2$H$_4$)-C$_2$H$_4$- attached to 4-position of 5-amino-4-cyano-isothiazole | 4-[N(C$_2$H$_4$CN)(C$_2$H$_5$)]phenyl | red |
| 102 | CH$_3$CO-N(cyclohexyl-H)-C$_2$H$_4$- attached to 4-position of 5-amino-4-cyano-isothiazole | 4-[N(C$_2$H$_4$CN)(C$_2$H$_5$)]phenyl | red |

EXAMPLE 103

6 parts of 5-amino-4-cyano-3-[2-(N-acetyl-N-ethylamino)-ethyl]-isothiazole were introduced into 35 parts of a 3:1 mixture of glacial acetic acid and propionic acid. 15 parts of 85% strength sulfuric acid were added, after which 8 parts of nitrosylsulfuric acid (11.5% of N$_2$O$_3$) were added dropwise at 0°–5° C., and stirring was continued for 4 hours at this temperature.

6.6 parts of N-ethyl-N-(2-propylaminocarbonyloxy)ethyl-m-toluidine were suspended in 10 parts by volume of 30% strength hydrochloric acid, 0.3 part of a fatty alcohol oxyethylate and 120 parts of water. 130 parts of ice were added, after which the diazonium salt solution was run in. When coupling was complete, the resulting dye suspension was filtered, and the filter cake was washed neutral with water and dried at 50° C. under reduced pressure to give 8 parts of the dye of the formula

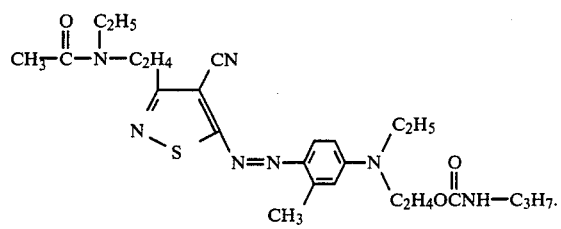

This dye dyes polyesters in clear violet hues.

D—N=N—K

| Example | Diazo component | Coupling component | Hue on polyesters |
|---|---|---|---|
| 104 | CH$_3$C(O)-N(C$_2$H$_5$)-C$_2$H$_4$- at 3-position of 4-cyano-isothiazole | 4-[N(C$_2$H$_5$)(C$_2$H$_4$OC(O)CH$_3$)]phenyl | red |
| 105 | " | 4-[N(C$_2$H$_5$)(C$_2$H$_4$OC(O)NHC$_3$H$_7$(n))]phenyl | red |
| 106 | " | 4-[N(C$_2$H$_5$)(C$_2$H$_4$OC(O)NHCH(CH$_3$)$_2$)]phenyl | red |
| 107 | " | 4-[N(C$_2$H$_4$CN)(C$_2$H$_4$OC(O)NHC$_3$H$_7$(n))]phenyl | red |

-continued
D—N=N—K
| Example | Diazo component | Coupling component | Hue on polyesters |
|---|---|---|---|
| 108 | " | 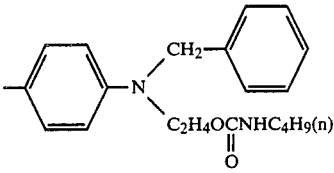 | red |
| 109 | " | 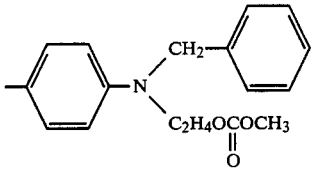 | red |
| 110 | " | 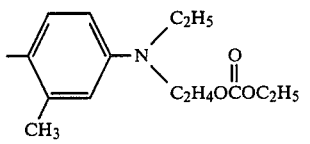 | red |
| 111 | " | 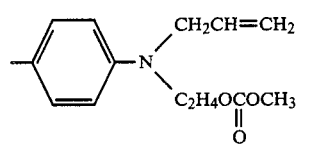 | red |
| 112 | " | 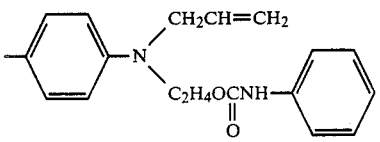 | red |
| 113 | " | 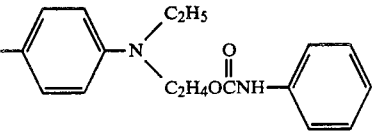 | red |
| 114 | " | 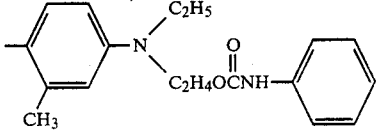 | violet |
| 115 | 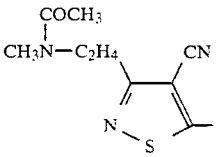 | 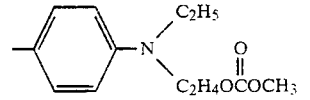 | red |
| 116 | " | 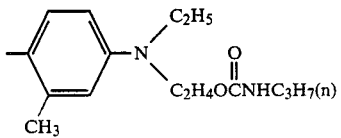 | violet |

-continued

| | D—N=N—K | | |
|---|---|---|---|
| Example | Diazo component | Coupling component | Hue on polyesters |
| 117 | C₆H₅-C(O)-N(C₂H₅)-C₂H₄-[3-(4-CN-5-methyl-isothiazolyl)] | 4-CH₃-C₆H₄-N(C₂H₄CN)(C₂H₄OCOC₂H₅) | red |
| 118 | " | 4-CH₃-C₆H₄-N(C₂H₅)(C₂H₄OC(O)NHC₃H₇(n)) | red |
| 119 | " | 4-CH₃-C₆H₄-N(C₂H₄COOCH₃)(C₂H₄OH) | red |
| 120 | " | 4-CH₃-C₆H₄-N(C₂H₄COOCH₃)(C₂H₄OCCH₃(O)) | red |
| 121 | CH₃C(O)-N(C₂H₅)-C₂H₄-[3-(4-CN-5-methyl-isothiazolyl)] | 4-methyl-1-(NH-C₂H₅)-naphthyl | blue |
| 122 | " | 1-methyl-2-hydroxy-naphthyl | red |
| 123 | " | 3-CH₃-C₆H₄-N(C₂H₄CN)(C₂H₄OC(O)NHC₃H₇(n)) | red |
| 124 | " | C₆H₅-N(C₂H₄OCH₃)(C₂H₄OC(O)NH-C₆H₅) | red |

We claim:
1. A compound of the formula:

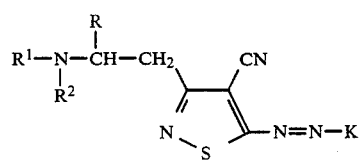

where R is hydrogen, C$_1$-C$_4$-alkyl, phenyl, chlorophenyl, methylphenyl, methoxyphenyl or nitrophenyl; R$^1$ is allyl, C$_1$-C$_8$-alkyl, C$_1$-C$_8$-alkyl substituted by C$_1$-C$_8$-alkoxy, phenoxy, phenyl or C$_1$-C$_8$-alkanoyloxy, cyclopentyl, cyclohexyl, and methylcyclohexyl, norbornyl, phenyl or phenyl substituted by chlorine, methyl or alkoxy; R$^2$ is C$_1$-C$_{10}$-alkanoyl, C$_1$-C$_{10}$-alkanoyl substituted by alkoxy or phenoxy, cyclohexanoyl, benzoyl, benzoyl substituted by chlorine, methyl or methoxy, C$_1$-C$_8$-alkoxycarbonyl, aminocarbonyl, phenylaminocarbonyl, CH$_3$NHCO, C$_2$H$_5$NHCO, C$_3$H$_7$NHCO, C$_4$H$_9$NHCO, (CH$_3$)$_2$NCO, CH$_3$SO$_2$, C$_6$H$_5$SO$_2$ or p—CH$_3$—C$_3$H$_4$—SO$_2$; or R$^1$ and R$^2$, together with the nitrogen atom, form a ring system selected from the group consisting of:

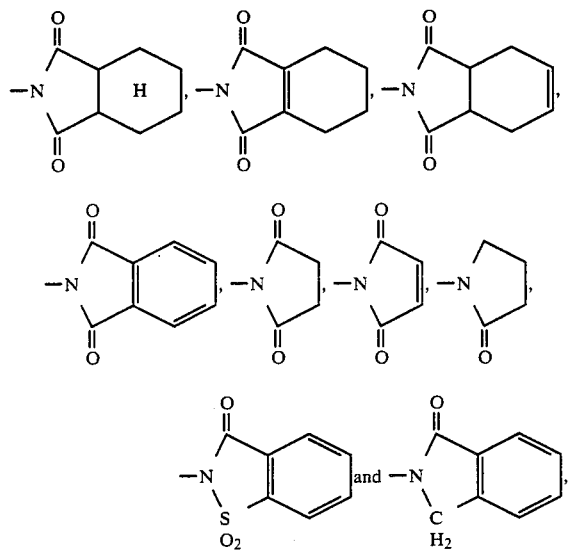

and K is a radical of a coupling component.

2. The compound as claimed in claim 1, wherein KH is of the formula:

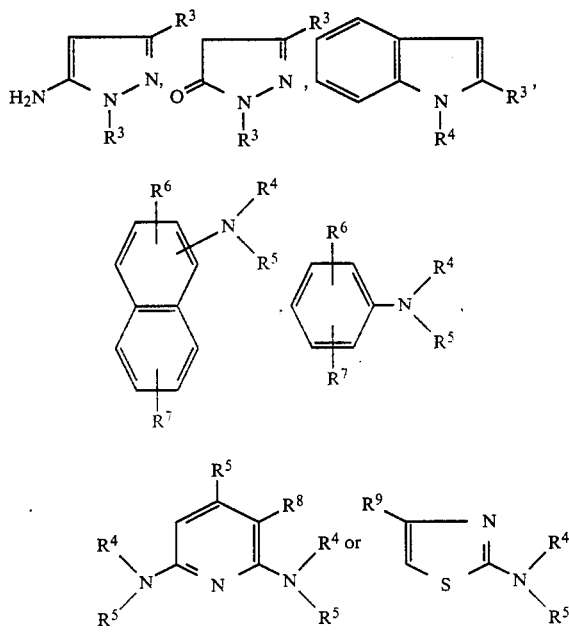

where R$^3$ is hydrogen, alkyl, aralkyl or aryl, R$^4$ is hydrogen or R$^5$, where R$^5$ is C$_1$-C$_6$-alkyl, or C$_1$-C$_6$-alkyl substituted by chlorine, bromine, hydroxyl, C$_1$-C$_8$-alkoxy, phenoxy, cyano, carboxyl, C$_1$-C$_8$-alkanoyloxy, C$_1$-C$_8$-alkoxy-C$_1$-C$_4$-alkoxy, benzoyloxy, o-, m- or p-methylbenzoyloxy, o-, m- or p-chlorobenzoyloxy, C$_1$-C$_8$-alkoxyalkanoyloxy, phenoxyalkanoyloxy, C$_1$-C$_8$-alkoxycarbonyloxy, C$_1$-C$_8$-alkoxyalkoxycarbonyloxy, benzyloxycarbonyloxy, phenethyloxycarbonyloxy, phenoxyethoxycarbonyloxy, C$_1$-C$_8$-alkylaminocarbonyloxy, cyclohexyl-aminocarbonyloxy, phenylamino-carbonyloxy, C$_1$-C$_8$-alkoxycarbonyl, C$_1$-C$_8$-alkoxyalkoxy-carbonyl, phenoxycarbonyl, benzyloxycarbonyl, phenoxy-C$_1$-C$_4$-alkoxy or phenethyloxycarbonyl, or phenyl, benzyl, phenethyl or cyclohexyl, R$^6$ and R$^7$ are each hydrogen, alkyl, alkoxy, phenoxy, halogen, alkylsulfonylamino, dialkylaminosulfonylamino, benzyloxy, benzylamino or C$_1$-C$_6$-alkanoylamino, R$^8$ is cyano, carbamyl, nitro or carbalkoxy, and R$^9$ is C$_1$-C$_4$-alkyl, C$_1$-C$_4$-alkoxycarbonylmethyl, cyanomethyl, benzyl or phenyl which is monosubstituted or polysubstituted by C$_1$-C$_{10}$-alkyl, C$_1$-C$_{10}$-alkoxy, phenoxy, benzyloxy, phenyl, chlorine, bromine, nitro, C$_1$-C$_4$-alkoxycarbonyl, C$_1$-C$_4$-mono- or di-alkylamino, C$_1$-C$_4$-alkoxyethoxy, C$_1$-C$_4$-alkyl- or phenyl-mercapto.

3. The compound as claimed in claim 2, wherein said R$^5$ substituent is methyl, ethyl, propyl, butyl, pentyl, hexyl, allyl, methallyl, 2-chloroethyl, 2-bromoethyl, 2-cyanoethyl, 2-hydroxyethyl, 2-phenyl-2-hydroxyethyl, 2,3-dihydroxypropyl, 2-hydroxy-propyl, 2-hydroxy-butyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2-phenyloxycarbonyloxyethyl, 2-benzyloxycarbonyloxyethyl, 2-methoxyethoxycarbonyloxyethyl, 2-ethoxyethoxycarbonyl-oxyethyl, 2-propoxyethoxycarbonyloxyethyl, 2-butoxyethoxycarbonyloxyethyl, 2-methylaminocarbonyl-oxyethyl, 2-ethyl-aminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonyl-ethyl, 2-$\beta$-phenyloxycarbonylethyl, 2-methoxyethoxycarbonylethyl, 2-ethoxyethoxycarbonylethyl, 2-propoxyethoxycarbonylethyl, 2-butoxyethoxycarbonylethyl or 2-phenoxyethoxycarbonylethyl.

4. A compound of the formula:

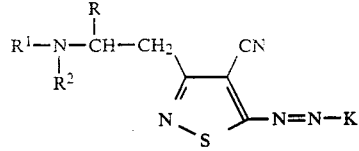

where R is hydrogen, C$_1$-C$_4$-alkyl, phenyl, chlorophenyl, methylphenyl, methoxyphenyl or nitrophenyl; R$^1$ is methyl, ethyl, propyl, butyl, hexyl, octyl, C$_2$H$_5$-OCH$_2$CH$_2$, CH$_3$OCH$_2$CH$_2$CH$_2$—, C$_4$H$_9$OCH$_2$CH$_2$C-

$H_2$—, $C_6H_5OCH_2CH_2$—, $C_6H_5OCH_2CH_2OCH_2CH_2CH_2$—, $C_6H_5CH_2$— or $C_6H_5CH_2CH_2$—; $R^2$ is $C_1$-$C_{10}$-alkanoyl $C_1$-$C_{10}$-alkanoyl substituted by alkoxy or phenoxyl, cyclohexanoyl, benzoyl, benzoyl substituted by chlorine, methyl or methoxy, $C_1$-$C_8$-alkoxycarbonyl, aminocarbonyl, phenylaminocarbonyl, $CH_3NHCO$, $C_2H_5NHCO$, $C_3H_7NHCO$, $C_4H_9NHCO$, $(CH_3)_2NCO$, $CH_3SO_2$, $C_6H_5SO_2$ or p—$CH_3$—$C_6H_4$—$SO_2$; or $R^1$ and $R^2$, together with the nitrogen atom, form a ring system selected from the group consisting of:

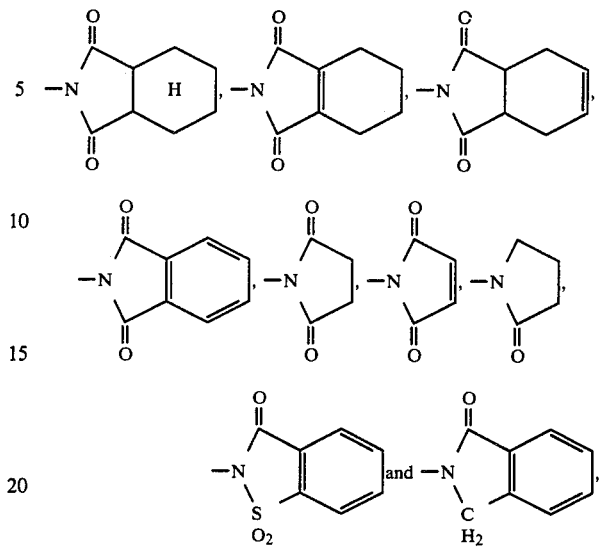

and K is a radical of a coupling component.

* * * * *